(12) United States Patent
Eda et al.

(10) Patent No.: US 9,325,800 B1
(45) Date of Patent: Apr. 26, 2016

(54) GENERATING A VISITATION SCHEDULE

(71) Applicant: International Business Machines Corporation, Armonk, NY (US)

(72) Inventors: Sasikanth Eda, Vijayawada (IN); Deepak R. Ghuge, Ahmednagar (IN); John G. Musial, Newburgh, NY (US); Sandeep R. Patil, Pune (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/575,341

(22) Filed: Dec. 18, 2014

(51) Int. Cl.
| | |
|---|---|
| *H04L 29/08* | (2006.01) |
| *H04W 4/02* | (2009.01) |
| *G06F 17/30* | (2006.01) |
| *G06Q 10/10* | (2012.01) |
| *G06Q 50/00* | (2012.01) |

(52) U.S. Cl.
CPC .......... *H04L 67/22* (2013.01); *G06F 17/30876* (2013.01); *G06Q 10/109* (2013.01); *G06Q 50/01* (2013.01); *H04L 67/1072* (2013.01); *H04W 4/025* (2013.01)

(58) Field of Classification Search
CPC .............. G06Q 50/01; G06Q 30/0269; G06Q 10/063114; H04L 67/306; H04L 51/32; H04L 67/22; H04L 51/043; H04L 65/4007; H04L 63/104; H04L 51/244; H04L 63/102; H04L 65/1069; H04L 12/1827; H04L 12/1895
USPC ....................................................... 455/456.3
See application file for complete search history.

(56) References Cited

U.S. PATENT DOCUMENTS

| 8,554,875 B1 | 10/2013 | Alfaro et al. |
| 2008/0293430 A1 | 11/2008 | Blom et al. |
| 2009/0157312 A1 | 6/2009 | Black et al. |
| 2013/0024391 A1 | 1/2013 | Vakil et al. |
| 2013/0231858 A1 | 9/2013 | Bourne |

(Continued)

FOREIGN PATENT DOCUMENTS

| EP | 1176840 A1 | 7/2001 |
| WO | 2012074734 A2 | 6/2012 |

OTHER PUBLICATIONS

Branckaute, Franky, "Facebook Statistics: The Numbers Game Continues", the Blog Herald, Filed as News on Aug. 11, 2010, <http://www.blogherald.com/2010/08/11/facebook-statistics-the-numbers-game-continues/>.

*Primary Examiner* — Kwasi Karikari
(74) *Attorney, Agent, or Firm* — Christopher McLane; Daniel R. Simek (57) ABSTRACT

The method includes identifying a location of an individual and an amount of time the individual will be in the location. The method further includes identifying one or more contacts of the individual that are within a threshold distance of the identified location of the individual during the identified amount time the individual will be in the location. The method further includes generating a first visitation schedule and corresponding visitation route for the individual based upon the identified status for the one or more contacts of the individual based upon social media activity, the identified frequency of interaction between the individual and the identified one or more contacts of the individual, and the determined distances from the individual to the identified one or more contacts and between each of the identified one or more contacts.

20 Claims, 3 Drawing Sheets

(56) References Cited

U.S. PATENT DOCUMENTS

2014/0244616 A1* 8/2014 Kuramura ...... G06Q 10/063114 707/722

2014/0282930 A1* 9/2014 Markwordt ........ G06Q 20/4014 726/5

* cited by examiner

GENERATING A VISITATION SCHEDULE

BACKGROUND OF THE INVENTION

The present invention relates generally to social networking, and more particularly to generating a prioritized schedule for visitations based upon social networking tendencies.

Social media is the social interaction among people in which the people create, share, or exchange information and ideas in virtual communities and networks. Furthermore, social media depends on mobile and web-based technologies to create highly interactive platforms through which individuals and communities share, co-create, discuss, and modify user-generated content. Social networks introduce substantial and pervasive changes to communication between organizations, communities, and individuals.

Social media technologies take on many different forms including magazines, Internet forums, weblogs, social blogs, microblogging, wikis, social networks, podcasts, photographs or pictures, video, rating, and social bookmarking. Technologies include blogging, picture-sharing, video blogs, wall-posting, activity streams, music-sharing, and crowdsourcing, to name a few. Social network aggregation can integrate many of the platforms in use.

Turn-by-turn navigation is a feature of some Global Positioning System (GPS) navigation devices where directions for a selected route are continually presented to the user in the form of spoken and visual instructions. The GPS system keeps the user up-to-date about the best route to the destination and is often updated according to changing factors such as traffic and road conditions. Turn-by-turn systems typically use an electronic voice to inform the user whether to turn left or right, the street name, and how much distance to the turn.

SUMMARY

Embodiments of the present invention disclose a method, computer program product, and system for creating a visitation plan for a user based on social media. In one embodiment, in accordance with the present invention, the computer-implemented method includes creating a visitation plan. The method further includes identifying a location of an individual and an amount of time the individual will be in the location. The method further includes identifying one or more contacts of the individual that are within a threshold distance of the identified location of the individual during the identified amount of time the individual will be in the location. The method further includes identifying a status for a contact from the one or more contacts of the individual based upon social media activity. The method further includes identifying a frequency of interaction between the individual and the contact from the one or more contacts of the individual. The method further includes determining a distance from the individual to the identified one or more contacts and the distance between each of the identified one or more contacts. The method further includes generating a first visitation schedule and corresponding visitation route for the individual based upon the identified status for the one or more contacts of the individual based upon social media activity, the identified frequency of interaction between the individual and the identified one or more contacts of the individual, and the determined distances from the individual to the identified one or more contacts and between each of the identified one or more contacts.

DETAILED DESCRIPTION

Implementation of embodiments of the invention may take a variety of forms, and exemplary implementation details are discussed subsequently with reference to the Figures.

Figure 1:
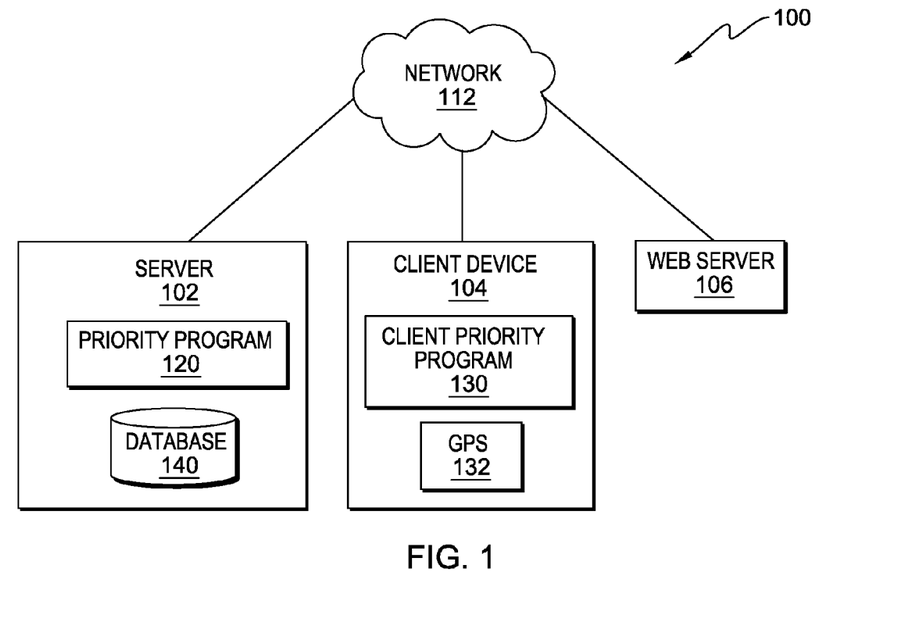
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102, client device 104, and web server 106 all interconnected over network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving, analyzing, and sending data. In this embodiment, server 102 generates a visitation plan for a user of client device 104 based on social media interaction and mapping data. In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with client device 104 and web server 106 via network 112. In another embodiment, server 102 represents a computing system utilizing clustered computers and components to act as a single pool of seamless resources. Server 102 may include components as depicted and described in further detail with respect to FIG. 3, in accordance with embodiments of the present invention. Server 102 includes priority program 120 and database 140.

In depicted distributed data processing environment 100, priority program 120 resides on server 102 and generates an optimized visitation plan on a map to cover a maximum number of locations within a specified time period depending upon priorities. The priorities are based upon the user's responses to recent activities and relationship importance as established on social media websites. In one embodiment, priority program 120 receives information from client priority program 130 (on client device 104), which includes preferences and recent activity, and priority program 120 generates a visitation plan based on the received information. In an example, priority program 120 may receive data from client priority program 130 regarding recent interaction with a friend or location (friends and/or location can also be referred to as contact(s) for the purpose of this application), or client priority program 130 may send data to priority program 120 with instructions to disregard a certain status type or location. In another embodiment, priority program 120 may be located on client device 104, and priority program 120 operates in a peer to peer system. In yet another embodiment, priority program 120 may receive data directly from a user of client device 104 via an Internet website. In an example, the user of client device 104 may remotely access priority program 120 without the client device having an application of priority program on client device 104. Priority program 120 is depicted and described in further detail with respect to FIG. 2.

In the depicted embodiment, database 140 resides on server 102. In another embodiment, database 140 may reside elsewhere in distributed data processing environment 100, such as within server 102, client device 104, or independently as a standalone database that is capable of communicating with server 102, and/or client device 104, and web server 106 via network 112. A database is an organized collection of data. Database 140 is implemented with any type of storage device capable of storing data that is accessed and utilized by server 102, client device 104, and web server 106, such as a database server, a hard disk drive, or a flash memory. In other embodiments, database 140 represents multiple storage devices within server 102. Database 140 stores information such as user preferences, status information from social media sites, interaction frequency for the user and friends and/or locations (contact(s)), addresses, calendar information, phone numbers, etc. For example, database 140 may store the password for a social media site on web server 106 used by client device 104, which would allow priority program 120 access to the social media site without approval by the user of client device 104.

In the depicted embodiment, client device 104 is one or more of a desktop computer, a laptop computer, a tablet computer, a specialized computer server, a smart phone, or any programmable electronic device capable of communicating with server 102 and web server 106 via network 112 and with various components and devices within distributed data processing environment 100. In general, client device 104 represents any programmable electronic device or combination of programmable electronic devices capable of executing machine readable program instructions and communicating with other computing devices via a network, such as network 112. Client device 104 may include components as depicted and described in further detail with respect to FIG. 3, in accordance with embodiments of the present invention. In an embodiment, client device 104 receives information, such as a recommendation of which locations to visit, the order in which to visit the locations, the amount of time to spend at the locations, and the direction to each location, from server 102 via network 112. In an example, client device 104 notifies the user of client device 104 that a visitation plan has been generated. The alert may be a phone call, text message, computer message, email, or any other alert known in the art. The alert may comprise information regarding location, names of people at a location, status of the people at the location or the status of the location, directions, allotted time at the location, etc. Client device 104 also contains client priority program 130 and global positioning system (GPS) 132.

In depicted distributed data processing environment 100, client priority program 130 resides on client device 104 and sends user input as well as user information (e.g., address books, password information for social media sites, etc.) to priority program 120. Client priority program 130 is a client-side application that corresponds to priority program 120 and facilitates communication and user interaction with priority program 120. Client priority program 130 can also receive notifications from priority program 120 containing possible generated routes, prompts for passwords, prompts for user feedback, notification of visitation plans, etc. In one embodiment, client priority program 130 may send and receive data directly with web server 106 and/or other client devices (not depicted).

In depicted data processing environment 100, GPS 132 resides on client device 104 and sends and receives location coordinates of client device 104 to server 102 and web server 106 and various other client devices or servers (not depicted) via network 112. In an example embodiment, GPS 132 is a space-based satellite navigation system that provides location and time information in all weather conditions, anywhere on or near the earth where there is an unobstructed line of sight to four or more GPS satellites. In one embodiment, GPS 132 may not be based off of satellites but may determine location based on triangulation with cellular tower or any other method known in the art.

In the depicted environment, web server 106 is one or more of a management server, a web server, or any other electronic device or computing system capable of receiving and sending data. In other embodiments, web server 106 represents a server computing system utilizing multiple computers as a server system, such as in a cloud computing environment. In another embodiment, web server 106 represents a laptop computer, a tablet computer, a netbook computer, a personal computer (PC), a desktop computer, a personal digital assistant (PDA), a smart phone, or any programmable electronic device capable of communicating with server 102 and client device 104 via network 112. In another embodiment, web server 106 represents a computing system utilizing clustered computers and components to act as a single pool of seamless resources. Web server 106 is a server that hosts Internet websites such as social media websites, mapping or direction websites, etc. In one embodiment, web server 106 may contain software and databases, such as social media programs, which a user of client device 106 may access to create profiles, add comments, add friends, etc. Server 102 may include components as depicted and described in further detail with respect to FIG. 3, in accordance with embodiments of the present invention.

Figure 2:
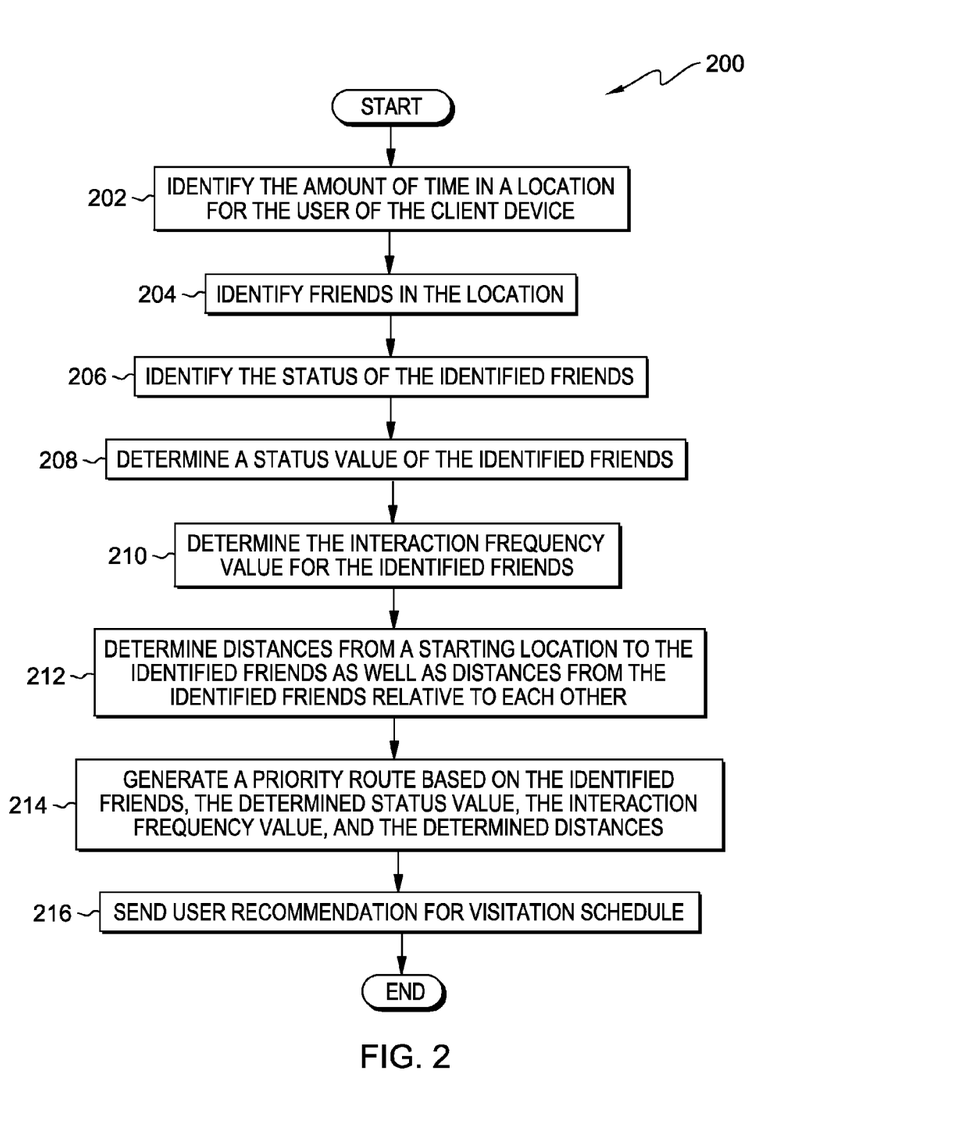
FIG. 2 is a flowchart depicting operational steps of a program for generating a visitation plan for a user based on social media interaction and mapping data within the distributed data processing environment of FIG. 1, in accordance with an embodiment of the present invention.

FIG. 2 is a flowchart depicting operational steps of priority program 120, in accordance with an embodiment of the present invention. Priority program 120 operates on server 102 and generates an optimized visitation plan on a map to cover a maximum number of locations within a specified time period depending upon priorities. The priorities are based upon the user's responses to recent activities and relationship importance as established on social media websites. In one embodiment, priority program 120 initiates in response to a user of client device 104 prompting priority program 120 to create a visitation plan. In another embodiment, priority program 120 may initiate creation of a visitation plan based on a calendar event for a user of client device 104. In yet another embodiment, priority program 120 may initiate creation of a visitation plan when the user of client device 104 is within a proximity to a location that the user of client device 104 has previously had a social media interaction with. For example, the user of client device 104 is within 5 miles of a contact who just had a child, and the user of client device 104 recently posted a positive comment related to the birth.

Priority program 120 identifies the amount of time a user of a client device has available in a location (step 202). In one embodiment, priority program 120 accesses the calendar of the user, located on client device 104, to identify the amount of time the user will have in a specific geographic location, thereby identifying a time and location for the user of client device 104. In another embodiment, priority program 120 accesses a social media website that is used by the user of client device 104 to identify posts in the social media website (e.g., on web server 106) that state an amount of time and a place that the user of client device 104 may be in a geographical location. In yet another embodiment, priority program 120 may receive a prompt from the user of client device 104 which may include an allotted amount of time and a geographical location. In one embodiment, priority program 120 may receive a notification from GPS 132 that client device 104 is in a location that the user of client device 104 has previously made of interest on a social media website. In an example, priority program 120 receives a notification from GPS 132 that the user of client device 104 is within a threshold distance or proximity (e.g., 20 miles) of the user of client device 104's home town. In this example, priority program 120 sends a notification to client priority program 130 to determine the length of time the user of client device 104 will be within the proximity threshold of the user of client device 104's home town, which is the identified location. The user of client device 104 may then send the requested information regarding the length of time the user of client device 104 will be within the proximity threshold of the user of client devices 104's home town to priority program 120.

Priority program 120 identifies one or more friends in the identified location (step 204). In one embodiment, priority program 120 accesses a social media website for the user of client device 104, located on web server 106, to identify friends, and/or locations of interest indicated on the social media website that are within a proximity threshold to the user of client device 104. In one example, priority program 120 sends a request for password information to the user of client device 104 before gaining access to the social media website for the user of client device 104. In another example, priority program 120 may have the passwords for social media websites for the user of client device 104 stored in database 140. In this embodiment, priority program 120 identifies people identified as friends by the user of client device 104 and locations that the user of client device 104 follows, and determines if the friends and/or locations of the user of client device 104 is within a preset proximity threshold of distance to the user of client device 104. In another embodiment, there may not be a user preset threshold of distance, instead priority program 120 may determine a distance based on local transit times, population density, and the identified total time for the user of client device 104 at the location.

In an example, priority program 120 accesses the social media profile on web server 106 for the user of client device 104. Priority program 120 identifies friends or locations that the user of client device 104 follows. Priority program 120 then identifies which friends or locations correspond to the location of the user of client device 104.

Priority program 120 identifies the status of the identified friends (step 206). In one embodiment, priority program 120 identifies the status of the identified friends for the user of client device 104 on web server 106. In one example, a friend may have set a status on a social media website stating that the friend just received a job promotion. In another example, a friend may have updated a status on a social media website stating that the friend is sick and in the hospital. In yet another example, a friend, which is actually a location or event, may have posted a status that the location is hosting a concert. In one embodiment, if the identified friend or location that is within a proximity threshold does not display a status, priority program 120 may send a notification to client device 104 asking for user input to determine a status for the identified friend or location without a posted status.

Priority program 120 determines a status value for the identified friends (step 208). In an embodiment, priority program 120 determines the status value for the identified friends and locations within the proximity threshold of client device 104. In one example, priority program 120 determines the value for each status based upon user presets for a status category, such as the birth of a child at a value of 5, the purchase of a new car at a value of 1, a graduation at a value of 3, etc. In another example, priority program 120 may determine the status value of the identified friend or location based upon trends of the user of client device 104, such as likes, comments, or other forms of social media interaction from the user. In this example, priority program 120 gives a status value of 5 (the highest rating) for a newborn child because the user of client device 104 has liked and/or made positive comments about newborn children more than any other status. In another example, priority program 120 averages user preset status values with social media comments and likes to create a final status value. In an embodiment, priority program 120 determines the status value based upon calculated trends, such as recent likes or comments.

In one embodiment, priority program 120 can interpret comments using natural language processing or any other process known by a person skilled in the art. In another embodiment, priority program 120 may send comments to a cognitive server (not depicted) to determine the rating a user of client device 104 would likely assign to a status based upon posted past comments of the user of client device 104 on social media sites (e.g., web server 106). In one example, priority program 120 determines a status value based on likes and comments on a social media site by the user of client device 104.

Priority program 120 determines an interaction frequency value for the identified friends (step 210). In one embodiment, priority program 120 determines the interaction frequency value between the user of client device 104 and the identified friends and locations within a proximity threshold. In an example, priority program 120 accesses social media websites of the user of client device 104 to determine how often the user of client device 104 contacts the identified friend or location via social media and calculates the frequency value based upon the how often contact is made. In another example, priority program 120 may access email records, text messages, telephone logs, and/or GPS tracking locations for the user of client device 104 to determine the frequency of interaction between the identified friend or location and the user of client device 104. In an embodiment, priority program 120 determines the interaction frequency value based upon how often contact has been established between the identified friend or location and the user of client device 104. In an example, priority program 120 assigns a higher value, such as 5, for an identified friend or location that the user of client device 104 has less contact with, as to increase the chances of a visitation plan including the friend or location for the user of client device 104. In an example, an administrator or user of priority program 120 may set the value scale of 5 for the highest value and 1 for the lowest value. In one embodiment, the user of client device 104 may be able to adjust an interaction frequency value which will change the likelihood of a visitation plan including a specific friend or location.

In an example, priority program 120 determines an interaction frequency by compiling all interactions with all friends and location based on phone calls, text messages, emails, social media interactions, video game playing, GPS tracking, etc. over the previous month and ranking them in order from the most amount of interaction to the least. Priority program 120 then assigns an interaction frequency value based on this ranking assigning the highest interaction frequency value for the least amount of interaction.

Priority program 120 determines the distances from a starting location to the identified friends as well as the distances from the identified friend's relative to each other (step 212). In one embodiment, priority program 120 determines the distance from the geographical location of client device 104 to the identified friends or locations. In an example, priority program 120 utilizes GPS 132 to determine the location of client device 104, then priority program 120 determines the location of an identified friend of the user of client device 104 (identified in step 204). In one example, priority program 120 determines the geographical location of the identified friend by searching an address book in database 140 located on client device 104 or on web server 106. In another example, priority program 120 may query the client device (not depicted) of the identified friend to determine a geographical location. In one embodiment, priority program 120 may search social media websites, such as a geo-social application, to determine whether a friend has checked in or logged on at a specific location. In another embodiment, priority program 120 may search a social media profile of a friend to determine a specific location of the friend.

In an embodiment, priority program 120 may identify the location for the identified friends and locations, and then using current mapping and direction technology already known in the art, determine the distances as they relate to client device 104. Priority program 120 may also determine the distances of the identified friends as the distances relate between the identified friends. In one embodiment, the determined distances of the identified friends and locations may change if an identified friend moves to a different geographical location. In this embodiment, priority program 120 may consistently update the distances to reflect the change in real time. In another embodiment, the user of client device 104 may preset a refresh time at 1 minute or any other time interval defined by the user. In yet another embodiment, priority program 120 may refresh in response to an identified friend changing geographical locations.

Priority program 120 generates a priority route based on the identified friends, the determined status values, the interaction frequency values, and the determined distances (step 214). In one embodiment, priority program 120 generates a priority route that includes a map of the identified friends and/or locations, the directions to friends and/or location, a time allotted for friend and/or location, and the status of the friend and/or location. In this embodiment, priority program 120 weighs various factors which comprise status values, interaction frequency values, and distances from client device 104 to the identified friends and locations and from the identified friends and locations relative to each other.

In one example, priority program 120 adds the status value and the interaction frequency value for the identified friend or location to create a priority value. In this example, the higher the status value equates to priority program 120 deeming the visit higher priority. If a friend just got married and the user of client device 104 has indicated that this type of event is very important, priority program 120 can assign a high value or importance for the status value. If the friend that just got married had a high interaction frequency value, meaning that the user of client device 104 and the newlywed friend have not spoken recently, then priority program 120 can assign a high value or importance for the interaction frequency value. Priority program 120 may then add the two high scores and determine that the visit for the identified newlywed friend has a high priority value. Priority program 120 also factors in the distance from client device 104 to the identified newlywed friend. If the distance is just on the edge of the proximity threshold for geographical location, then priority program 120 would be less likely to add the newlywed friend to the visitation plan.

In one embodiment, priority program 120 also determines the amount of time allocated at each location based upon the status value, the interaction frequency value, and the total allotted time in the location for the user of client device 104. In one example, priority program 120 has determined that the status value and the interaction frequency values are both high and the geographical location of the identified friend is close to client device 104. In this example, priority program 120 may allot a larger portion of time for the user of client device 104 to spend at the location. In another example, priority program 120 identifies a location that has relatively low values for status value and the interaction frequency values, but the location is very close to a friend with high status values and interaction frequency values. In this example, priority program 120 may still determine to add the identified location to the visitation plan because the location is located close to a high value friend, but priority program may allocate a small portion of time to spend at the location.

In one embodiment, priority program 120 first determines all the values for the identified friends and locations and then generates a route, or visitation plan, based on the distances from the user of client device 104 and from the other identified friends and location. In one example, priority program 120 may try to optimize the amount of visits the user of client device 104 can have based on prior feedback from the user of client device 104. In another example, priority program may create a visitation plan in which identified friends and locations with high values are sure to be added to the visitation plan. In another embodiment, priority program 120 determines a visitation plan based on a user defined number of friends to visit.

Priority program 120 sends the user of a client device a recommendation for a visitation schedule (step 216). In one embodiment, priority program 120 sends the user of client device 104 a notification via email, text, picture message, or any other method known by one skilled in the art. In one example, priority program 120 generates a detailed map using existing mapping programs which pinpoint locations of identified friends and/or locations on the map that have been added to the visitation plan, as well as a status of the identified friends and/or locations, time allotment for each identified friend and/or location, and directions for each identified friend or location on the visitation plan. In one embodiment, priority program 120 may generate multiple variations of a visitation plan including different routes, time allotments, and/or identified friends and/or locations. The user of client device 104 may be able to pick the preferred visitation plan from the list of generated visitation plans. In one example, the user of client device 104 may not like any of the generated visitation plans and specifically request that a friend and or location be included or excluded in the visitation plan. In this example, priority program 120 may return to step 204 but tag the user identified friend and/or location to be include or excluded in the next notification. In various embodiments, if the user of client device 104 overstays the allotted time for a friend or location, priority program 120 may create a new visitation plan starting at step 204 or may adjust the times allotted for future stops on the visitation plan.

Figure 3:
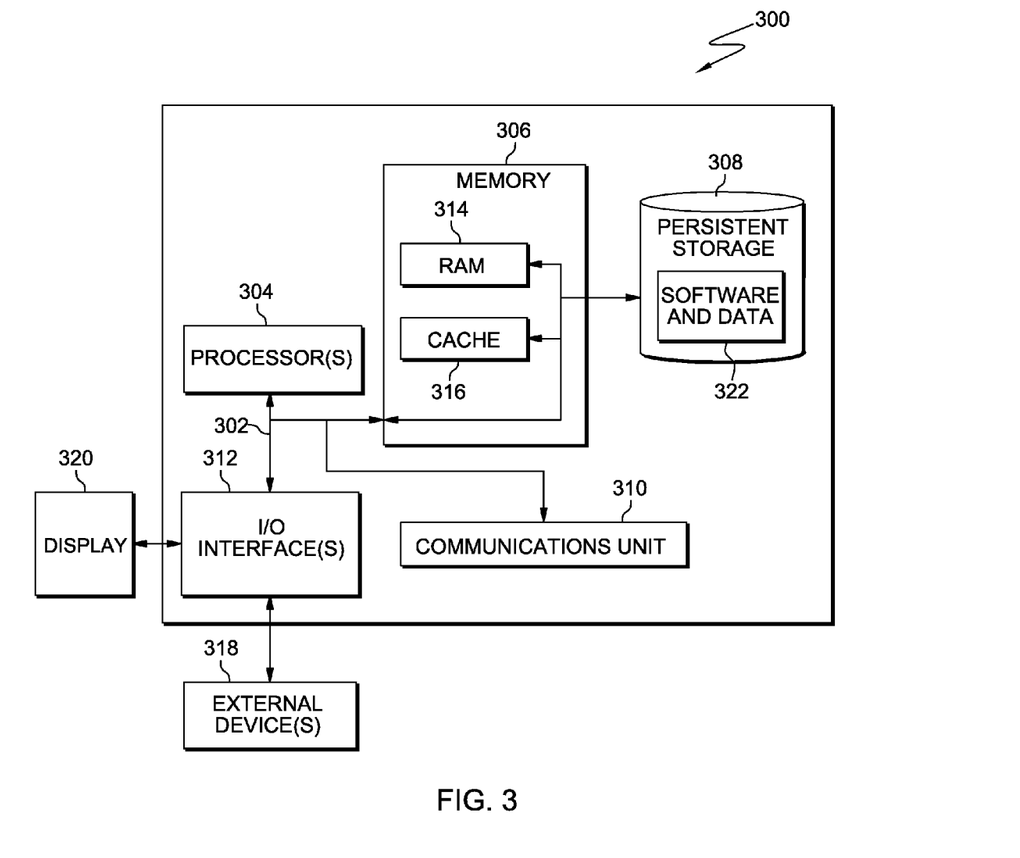
FIG. 3 depicts a block diagram of components of a client device, a server, and a web server of FIG. 1, in accordance with an embodiment of the present invention.

FIG. 3 depicts a block diagram of components of computer 300, which is representative of server 102 and client device 104, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media. Software and data 322 are stored in persistent storage 308 for access and/or execution by processor(s) 304 via one or more memories of memory 306. With respect to server 102, software and data 322 represents priority program 120 and database 140. With respect to client device 104, software and data 322 represents client priority program 130.

In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface(s) 312 may provide a connection to external device(s) 318 such as a keyboard, a keypad, a touch screen, and/or some other suitable input device. External device(s) 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating a visitation plan for a user based on social media, the method comprising:
   identifying, by one or more computer processors, a location of an individual and an amount of time the individual will be in the location;
   identifying, by one or more computer processors, one or more contacts of the individual that are within a threshold distance of the identified location of the individual during the identified amount time the individual will be in the location;
   identifying, by one or more computer processors, a status for a contact from the one or more contacts of the individual based upon social media activity;
   identifying, by one or more computer processors, a frequency of interaction between the individual and the contact from the one or more contacts of the individual;
   determining, by one or more computer processors, a distance from the individual to the identified one or more contacts and a distance between each of the identified one or more contacts; and
   generating, by one or more computer processors, a first visitation schedule and corresponding visitation route for the individual based upon the identified status for the one or more contacts of the individual based upon social media activity, the identified frequency of interaction between the individual and the identified one or more contacts of the individual, and the determined distances from the individual to the identified one or more contacts and between each of the identified one or more contacts.

2. The method of claim 1, further comprising:
   sending, by one or more computer processors, the generated visitation schedule and visitation route to a computing device associated with the individual.

3. The method of claim 1, further comprising:
   receiving, by one or more computer processors, data indicating feedback from the individual pertaining to the first visitation schedule and visitation route; and
   generating, by one or more computer processors, a second visitation schedule and corresponding visitation route based upon data from the individual pertaining to the first visitation schedule and corresponding visitation route.

4. The method of claim 1, further comprising:
   identifying, by one or more computer processors, an updated location of the individual; and
   generating, by one or more computer processors, a second visitation schedule and corresponding visitation route based on the updated location of an individual, the identified status for the one or more contacts of the individual based upon social media activity, the identified frequency of interaction between the individual and the identified one or more contacts of the individual, and the determined distances between the user of the client device and the distantness between each identified contact.

5. The method of claim 1, wherein generating a first visitation schedule and corresponding visitation route further comprises:
  determining, by one or more computer processors, a value for the contact from the one or more contacts based on the identified status of the contact, wherein the value is calculated based on likes and comments associated with the identified status of the contact; and
generating, by one or more computer processors, the first visitation schedule and corresponding visitation route based on determined values for the one or more contacts based on identified statuses of the identified one or more contacts.

6. The method of claim 1, wherein generating a first visitation schedule and corresponding visitation route further comprising:
  determining, by one or more computer processors, a value for the contact from the one or more contacts based on the identified frequency of interaction between the individual and the contact from the one or more contacts of the individual, wherein the value is calculated based on a number of communications between the individual and the contact on a social media website; and
  generating, by one or more computer processors, the first visitation schedule and corresponding visitation route based on determined values for the one or more contacts based on the identified frequencies of interaction.

7. The method of claim 5, wherein generating the first visitation schedule and corresponding visitation route based on determined values for the one or more contacts based on identified statuses of the identified one or more contacts comprises:
  calculating, by one or more computer processors, an order for the identified one or more contacts based on the determined value; and
  generating, by one or more computer processors, the first visitation schedule and corresponding visitation route based at least in part on the calculated order, a determined distance from the individual to the one or more contacts, and the identified amount of time the individual will be in the identified location.

8. A computer program product for creating a visitation plan for a user based on social media, the computer program product comprising:
  one or more computer readable storage devices and program instructions stored on the one or more computer readable storage devices, the program instructions comprising:
  program instructions to identify a location of an individual and an amount of time the individual will be in the location;
  program instructions to identify one or more contacts of the individual that are within a threshold distance of the identified location of the individual during the identified amount time the individual will be in the location;
  program instructions to identify a status for a contact from the one or more contacts of the individual based upon social media activity;
  program instructions to identify a frequency of interaction between the individual and the contact from the one or more contacts of the individual;
  program instructions to determine a distance from the individual to the identified one or more contacts and a distance between each of the identified one or more contacts; and
  program instructions to generate a first visitation schedule and corresponding visitation route for the individual based upon the identified status for the one or more contacts of the individual based upon social media activity, the identified frequency of interaction between the individual and the identified one or more contacts of the individual, and the determined distances from the individual to the identified one or more contacts and between each of the identified one or more contacts.

9. The computer program product of claim 8, further comprising program instructions to:
  send the generated visitation schedule and visitation route to a computing device associated with the individual.

10. The computer program product of claim 8, further comprising program instructions to:
  receive data indicating feedback from the individual pertaining to the first visitation schedule and visitation route; and
  generate a second visitation schedule and corresponding visitation route based upon data from the individual pertaining to the first visitation schedule and corresponding visitation route.

11. The computer program product of claim 8, further comprising program instructions to:
  identify an updated location of the individual; and
  generate a second visitation schedule and corresponding visitation route based on the updated location of an individual, the identified status for the one or more contacts of the individual based upon social media activity, the identified frequency of interaction between the individual and the identified one or more contacts of the individual, and the determined distances between the user of the client device and the distantness between each identified contact.

12. The computer program product of claim 8, wherein generating a first visitation schedule and corresponding visitation route further comprises program instructions to:
  determine a value for the contact from the one or more contacts based on the identified status of the contact, wherein the value is calculated based on likes and comments associated with the identified status of the contact; and
generate the first visitation schedule and corresponding visitation route based on determined values for the one or more contacts based on identified statuses of the identified one or more contacts.

13. The computer program product of claim 8, wherein generating a first visitation schedule and corresponding visitation route further comprising program instructions to:
  determine a value for the contact from the one or more contacts based on the identified frequency of interaction between the individual and the contact from the one or more contacts of the individual, wherein the value is calculated based on a number of communications between the individual and the contact on a social media web site; and
  generate the first visitation schedule and corresponding visitation route based on determined values for the one or more contacts based on the identified frequencies of interaction.

14. The computer program product of claim 12, wherein generating the first visitation schedule and corresponding visitation route based on determined values for the one or more contacts based on identified statuses of the identified one or more contacts comprises program instructions to:
  calculate an order for the identified one or more contacts based on the determined value; and generate the first visitation schedule and corresponding visitation route based at least in part on the calculated order, a determined distance from the individual to the one or more contacts, and the identified amount of time the individual will be in the identified location.

15. A computer system for creating a visitation plan for a user based on social media, the computer system comprising:
one or more computer processors;
one or more computer readable storage media;
program instructions stored on the computer readable storage media for execution by at least one of the one or more computer processors, the program instructions comprising:
program instructions to identify a location of an individual and an amount of time the individual will be in the location;
program instructions to identify one or more contacts of the individual that are within a threshold distance of the identified location of the individual during the identified amount time the individual will be in the location;
program instructions to identify a status for a contact from the one or more contacts of the individual based upon social media activity;
program instructions to identify a frequency of interaction between the individual and the contact from the one or more contacts of the individual;
program instructions to determine a distance from the individual to the identified one or more contacts and a distance between each of the identified one or more contacts; and
program instructions to generate a first visitation schedule and corresponding visitation route for the individual based upon the identified status for the one or more contacts of the individual based upon social media activity, the identified frequency of interaction between the individual and the identified one or more contacts of the individual, and the determined distances from the individual to the identified one or more contacts and between each of the identified one or more contacts.

16. The computer system of claim 15, further comprising program instructions to:
send the generated visitation schedule and visitation route to a computing device associated with the individual.

17. The computer system of claim 15, further comprising program instructions to:
receive data indicating feedback from the individual pertaining to the first visitation schedule and visitation route; and
generate a second visitation schedule and corresponding visitation route based upon data from the individual pertaining to the first visitation schedule and corresponding visitation route.

18. The computer system of claim 15, further comprising program instructions to:
identify an updated location of the individual; and
generate a second visitation schedule and corresponding visitation route based on the updated location of an individual, the identified status for the one or more contacts of the individual based upon social media activity, the identified frequency of interaction between the individual and the identified one or more contacts of the individual, and the determined distances between the user of the client device and the distantness between each identified contact.

19. The computer system of claim 15, wherein generating a first visitation schedule and corresponding visitation route further comprises program instructions to:
determine a value for the contact from the one or more contacts based on the identified status of the contact, wherein the value is calculated based on likes and comments associated with the identified status of the contact; and
generate the first visitation schedule and corresponding visitation route based on determined values for the one or more contacts based on identified statuses of the identified one or more contacts.

20. The computer system of claim 15, wherein generating a first visitation schedule and corresponding visitation route further comprising program instructions to:
determine a value for the contact from the one or more contacts based on the identified frequency of interaction between the individual and the contact from the one or more contacts of the individual, wherein the value is calculated based on a number of communications between the individual and the contact on a social media website; and
generate the first visitation schedule and corresponding visitation route based on determined values for the one or more contacts based on the identified frequencies of interaction.

* * * * *